United States Patent
Zhang et al.

(10) Patent No.: US 8,263,702 B2
(45) Date of Patent: Sep. 11, 2012

(54) FUSER COATING COMPOSITION AND METHOD OF MANUFACTURE

(75) Inventors: Qi Zhang, Mississauga (CA); Yu Qi, Oakville (CA); Carolyn P. Moorlag, Mississauga (CA); Nan-Xing Hu, Oakville (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/022,716

(22) Filed: Feb. 8, 2011

(65) Prior Publication Data

US 2012/0202932 A1    Aug. 9, 2012

(51) Int. Cl.
C08L 69/00     (2006.01)
B32B 27/08     (2006.01)
B32B 9/04      (2006.01)
B05D 5/04      (2006.01)
G03G 15/20     (2006.01)

(52) U.S. Cl. ........ 524/537; 524/426; 428/421; 428/447; 427/58; 399/333

(58) Field of Classification Search .......... 524/537, 524/426; 428/421, 447; 427/58; 399/333
See application file for complete search history.

(56) References Cited

U.S. PATENT DOCUMENTS

2010/0148128 A1* 6/2010 Shah et al. ............ 252/507

OTHER PUBLICATIONS

Poly(alkylene carbonates) Typical Properties; Empower Materials, no date.*

* cited by examiner

*Primary Examiner* — Michael Pepitone
(74) *Attorney, Agent, or Firm* — Hoffman Warnick LLC

(57) ABSTRACT

The present teachings include a coating composition of an aqueous dispersion of fluorine-containing particles and poly (alkylene carbonate). A method of making a fuser member and the fuser member resulting there from is also provided.

11 Claims, 2 Drawing Sheets

FUSER COATING COMPOSITION AND METHOD OF MANUFACTURE

BACKGROUND

1. Field of Use

This disclosure is generally directed to fuser members useful in electrophotographic imaging apparatuses, including digital, image on image, and the like. This disclosure also relates to processes for making and using fuser members.

2. Background

In a typical electrophotographic imaging apparatus, an image of an original to be copied, or the electronic document image, is recorded in the form of an electrostatic latent image upon a photosensitive member and the latent image is subsequently rendered visible by the application of thermoplastic resin particles or composites thereof which are commonly referred to as toner. The visible toner image is in a loose powdered form and can be easily disturbed or destroyed. The toner image is usually fixed or fused upon a substrate or support member which may be a cut sheet or continuous media, such as plain paper.

A fuser or image fixing member, which can be a rolls or a belt, may be prepared by applying one or more layers to a suitable substrate. Cylindrical fuser and fixer rolls, for example, may be prepared by applying an elastomer or fluoroelastomer to an aluminum cylinder. The coated roll is heated to cure the elastomer.

Fuser members may be composed of a resilient layer with a fluoropolymer topcoat as the release layer. Fluoropolymers can withstand high temperature (>200° C.) and pressure conditions and exhibit chemical stability and low surface energy, i.e. release properties. For instance, fluoroplastics, such as TEFLON® from E.I. DuPont de Nemours, Inc. have a lower surface energy due to high fluorine content and are widely used for oil-less fusing.

Fluoroplastics, such as PTFE and PFA, can be applied by coating techniques onto a fuser member substrate to form a release layer. Since fluoroplastics typically require high baking temperatures (i.e. over 300° C.) to form a continuous film, which is well above the decomposition temperature of resilient layer, typically silicone (about 250° C.), the processing window for forming a fluoroplastic topcoat over a silicone-containing substrate to achieve uniform coatings without defects is extremely narrow. Cracks and bubbles are the two major defects observed during the fabrication of such fuser members. It would be desirable to have a coating method and composition that reduced or eliminated cracks and bubbles when forming the fluoroplastic topcoat. In addition, it would be desirable to provide a fuser topcoat that has a wider processing latitude.

SUMMARY

According to various embodiments, the present teachings include a coating composition comprising an aqueous dispersion of fluorine-containing particles and poly(alkylene carbonate).

An alternate embodiment includes a method of making a fuser member. The method includes obtaining a fuser member comprising a resilient layer disposed on a substrate. An aqueous dispersion of fluorine-containing particles and poly(alkylene carbonate) is coated on the resilient layer to form a coated layer. The coated layer is heated to a temperature of from about 200° C. to about 260° C. wherein the poly(alkylene carbonate) decomposes. The coated layer is heated to a temperature of from about 260° C. to about 350° C. to form a release layer.

A further aspect described herein is a fuser member. The fuser member includes a coated layer obtained by applying a coating composition comprising an aqueous dispersion of fluorine-containing particles and poly(alkylene carbonate).

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

It should be noted that some details of the drawings have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Figure 1:
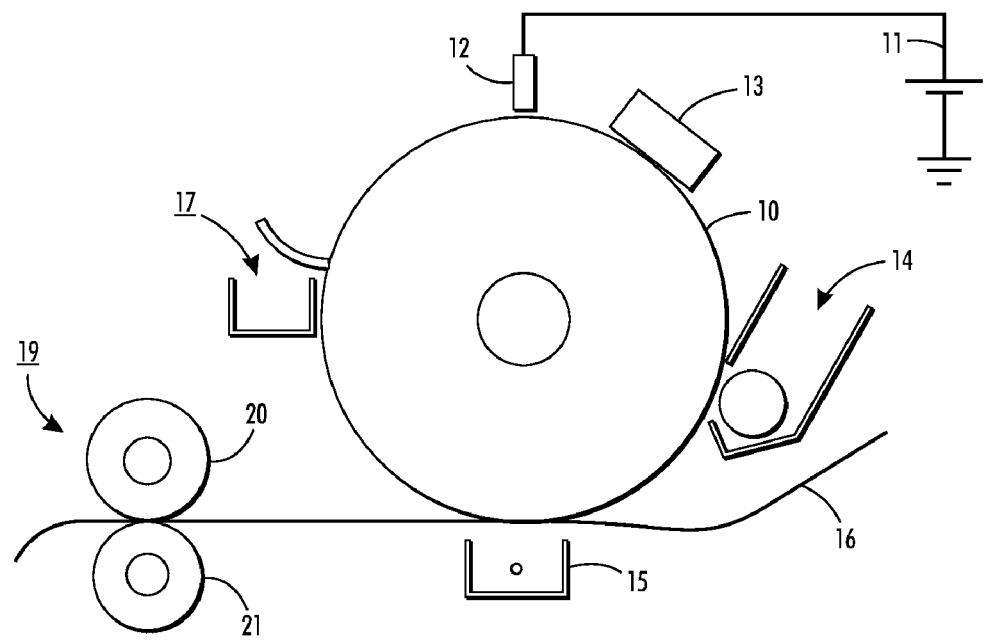
FIG. 1 is a schematic illustration of an image apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles, which are commonly referred to as toner. Specifically, a photoreceptor 10 is charged on its surface by means of a charger 12 to which a voltage has been supplied from a power supply 11. The photoreceptor 10 is then imagewise exposed to light from an optical system or an image input apparatus 13, such as a laser and light emitting diode, to form an electrostatic latent image thereon. Generally, the electrostatic latent image is developed by bringing a developer mixture from a developer station 14 into contact therewith. Development can be effected by use of a magnetic brush, powder cloud, or other known development process. A dry developer mixture usually comprises carrier granules having toner particles adhering triboelectrically thereto. Toner particles are attracted from the carrier granules to the latent image, forming a toner powder image thereon. Alternatively, a liquid developer material may be employed, which includes a liquid carrier having toner particles dispersed therein. The liquid developer material is advanced into contact with the electrostatic latent image and the toner particles are deposited thereon in image configuration.

After the toner particles have been deposited on the photoconductive surface in image configuration, they are transferred to a copy sheet 16 by a transfer means 15, which can be pressure transfer or electrostatic transfer. Alternatively, the developed image can be transferred to an intermediate transfer member, or bias transfer member, and subsequently transferred to a copy sheet. Examples of copy substrates include paper, transparency material such as polyester, polycarbonate, or the like, cloth, wood, or any other desired material upon which the finished image will be situated.

After the transfer of the developed image is completed, copy sheet 16 advances to a fusing station 19, depicted in FIG. 1 as a fuser roll 20 and a pressure roll 21 (although any other fusing components such as fuser belt in contact with a pressure roll, fuser roll in contact with pressure belt, and the like, are suitable for use with the present apparatus), wherein the developed image is fused to copy sheet 16 by passing copy sheet 16 between the fusing and pressure rolls, thereby forming a permanent image. Alternatively, transfer and fusing can be effected by a transfix application.

Photoreceptor 10, subsequent to transfer, advances to cleaning station 17, wherein any toner left on photoreceptor 10 is cleaned therefrom by use of a blade (as shown in FIG. 1), brush, or other cleaning apparatus.

Figure 2:
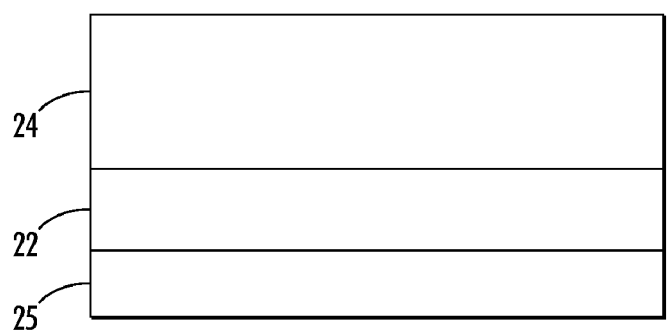
FIG. 2 is a schematic of an embodiment of a fuser member.

FIG. 2 is an enlarged schematic view of an embodiment of a fuser member, demonstrating the various possible layers. The fuser member can be a roller or a belt. As shown in FIG. 2, a substrate 25 has a resilient or intermediate layer 22 thereon. On intermediate layer 22 is a release layer 24 or surface layer.

Substrate

Examples of suitable substrate 25 materials include, in the case of a roller configuration, metals such as aluminum, stainless steel, steel, nickel and the like. In embodiments having a belt configuration, the substrate material can include polymers such as polyimides, polyamideimides, polyetherimides, polyether ether ketones and polyphenylene sulfides.

Resilient or Intermediate Layer

Examples of materials used for the intermediate layer 22 (also referred to as cushioning layer or resilient layer) include fluorosilicones, silicone rubbers such as room temperature vulcanization (RTV) silicone rubbers, high temperature vulcanization (HTV) silicone rubbers, and low temperature vulcanization (LTV) silicone rubbers. These rubbers are known and readily available commercially, such as SILASTIC® 735 black RTV and SILASTIC® 732 RTV, both from Dow Corning; 106 RTV Silicone Rubber and 90 RTV Silicone Rubber, both from General Electric; and JCR6115CLEAR HTV and SE4705U HTV silicone rubbers from Dow Corning Toray Silicones. Other suitable silicone materials include siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182. Commercially available LSR rubbers include Dow Corning Q3-6395, Q3-6396, SILASTIC® 590 LSR, SILASTIC® 591 LSR, SILASTIC® 595 LSR, SILASTIC® 596 LSR, and SILASTIC® 598 LSR from Dow Corning. The functional layers provide elasticity and can be mixed with inorganic particles, for example SiC or $Al_2O_3$, as required.

Other examples of the materials suitable for use as intermediate layer 22 also include fluoroelastomers. Fluoroelastomers are from the class of 1) copolymers of two of vinylidenefluoride, hexafluoropropylene, and tetrafluoroethylene; 2) terpolymers of vinylidenefluoride, hexafluoropropylene, and tetrafluoroethylene; and 3) tetrapolymers of vinylidenefluoride, hexafluoropropylene, tetrafluoroethylene, and cure site monomer. These fluoroelastomers are known commercially under various designations such as VITON A®, VITON B® VITON E® VITON E 60C®, VITON E430®, VITON 910®, VITON GH®; VITON GF®; and VITON ETP®. The VITON® designation is a Trademark of E.I. DuPont de Nemours, Inc. The cure site monomer can be 4-bromoperfluorobutene-1,1,1-dihydro-4-bromoperfluorobutene-1,3-bromoperfluoropropene-1,1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company. Additional commercially available materials include AFLAS™ a poly(propylene-tetrafluoroethylene), and FLUOREL II® (LII900) a poly(propylene-tetrafluoroethylenevinylidenefluoride), both also available from 3M Company, as well as the Tecnoflons identified as FOR-60KIR, FOR-LHF® NM® FOR-THF®, FOR-TFS® TH® NH®, P757®, TNS®, T439®, PL958®, BR9151® and TN505, available from Solvay Solexis.

Examples of three known fluoroelastomers are (1) a class of copolymers of two of vinylidenefluoride, hexafluoropropylene, and tetrafluoroethylene, such as those known commercially as VITON A®; (2) a class of terpolymers of vinylidenefluoride, hexafluoropropylene, and tetrafluoroethylene known commercially as VITON B®; and (3) a class of tetrapolymers of vinylidenefluoride, hexafluoropropylene, tetrafluoroethylene, and cure site monomer known commercially as VITON GH® or VITON GF®.

The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene, with about 2 weight percent cure site monomer.

The thickness of the intermediate layer 22 is from about 30 microns to about 10 millimeters, or from about 100 microns to about 800 microns, or from about 150 microns to about 500 microns.

Release Layer

An exemplary embodiment of a release layer 24 includes fluorine-containing polymers. These polymers include fluoropolymers comprises a repeating unit corresponding to a monomer that is selected from a group consisting of tetrafluoroethylene (TFE), hexafluoropropylene (HFP), perfluoropropyl vinyl ether (PPVE), perfluoroethyl vinyl ether (PEVE), perfluoromethyl vinyl ether (PMVE), chlorotrifluoroethylene (CTFE), vinyl fluoride (VF), and vinylidene fluoride (VDF), and a combination thereof. The fluoropolymers may be linear or branched, and cross-linked. Examples of fluoropolymer include polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), hexafluoropropylene (HFP) and a cure site monomer, and mixtures thereof. The fluoropolymer provides chemical and thermal stability and has a low surface energy. The fluorine-containing polymer has a melting temperature of from about 255° C. to about 360° C. or from about 280° C. to about 330° C.

For the fuser member, the thickness of the outer surface layer or release layer 24 can be from about 5 microns to about 250 microns, or from about 20 microns to about 80 microns, or from about 30 microns to about 60 microns. The release layer 24 or surface layer has an electrical surface resistivity ranging from about $10^3$ to about $10^8$ Ω/sq, or from about $5 \times 10^3$ to about $1.5 \times 10^6$ Ω/sq, or from about $8 \times 10^3$ to about $1.5 \times 10^4$ Ω/sq.

Adhesive Layer(s)

Optionally, any known and available suitable adhesive layer, also referred to as a primer layer may be positioned between the release layer 24, the functional intermediate layer 22 and the substrate 25. Examples of suitable adhesives include silanes such as amino silanes (such as, for example, HV Primer 10 from Dow Corning), titanates, zirconates, aluminates, and the like, and mixtures thereof. In an embodiment, an adhesive in from about 0.001 percent to about 10 percent solution can be wiped on the substrate. The adhesive layer can be coated on the substrate, or on the outer layer, to a thickness of from about 0.1 micrometer to about 10 micrometers, or from about 1 micrometers to about 6 micrometers. The adhesive can be coated by any suitable known technique, including spray coating or wiping.

Fluoroplastics have been used as the topcoat materials for oil-less fusing for their good releasing property. PFA and PTFE, the most representative fluoroplastics for fusing applications, are chemically and thermally stable and possess a low surface energy. However, these materials are also highly crystalline and therefore difficult to process. High temperature sintering (>350° C.) is the only way to make them into a continuous film. The resilient layer, typically silicone, starts to degrade around 250° C. It is theorized that when melting the topcoats at temperatures greater than 300° C., the silicone rubber releases gas or small molecules. The cracks and bubbles formed in the fluoroplastic surface layer coatings are caused by the silicone rubber degradation while baking the fluoroplastic surface layer at high temperatures. The required baking temperature for PFA is over 320° C., which is well above the decomposition temperature of silicone rubber (about 250° C.). When the decomposed materials release during the formation of the fluoroplastic surface layer, cracks or bubbles are formed. The current fluoroplastic coating formulations provide an extremely narrow processing window to achieve a defect-free fluoroplastic topcoat. The manufacturing yield of the fluoroplastic fuser topcoats is very low.

Tuning the process conditions (i.e. heating temperatures, ramping temperatures, primer or adhesive types and thickness) can improve the coating quality to certain extent. Materials solutions are desired to expand the coating process latitude.

Disclosed herein is a coating composition of fluorine-containing particles and a sacrificial material that completely decomposes to water and $CO_2$ and generates pores to release which leaves nothing in the release layer or topcoat. A thick and continuous topcoat can be achieved without defects. The composition comprises an aqueous dispersion of fluorine-containing particles and a poly(alkylene carbonate) sacrificial material. The topcoat coating dispersion is prepared by mixing the fluorine-containing particles coating dispersion and the aqueous dispersion of poly(alkylene carbonate), which is a foaming agent commercially available from Empower Materials. Poly(alkylene carbonate) decomposes at about 250° C. to water and $CO_2$. The amount of poly(alkylene carbonate) in the topcoat coating dispersion ranges from about 1 weight percent to about 30 weight percent, or from about 2 weight percent to about 15 weight percent, or from about 3 weight percent to about 10 weight percent.

The fluoropolymer topcoat is fabricated by coating the coating composition on a silicone-molded roll to form a coated layer, followed by heating at a temperature that the poly(alkylene carbonate) decomposes and then at a temperature above the melting temperature of the fluoropolymer to form the coated layer. The melting temperature of fluoropolymers is from about 260° C. to about 350° C., or from about 280° C. to about 340° C., or from about 300° C. to about 330° C. When the poly(alkylene carbonate) decomposes, uniform pores are formed throughout the coating, which allow the volatiles generated from the silicone degradation (>250° C.) to release from the coating and dissipate the internal stress. When the temperature is further increased to melt fluoropolymer, the pores are sealed and a continuous fluoropolymer coated layer is formed. As a result, a defect-free, >30 μm-thick PFA topcoat has been achieved with a wider processing latitude.

The fluorine-containing particles can be in a form of colloid dispersion, latex, suspension, or mixtures thereof. As used herein and unless otherwise specified, the term "fluorine-containing particles" refers any particles that contain atoms of fluorine. The fluorine content can be at least about 58% by weight of the fluorine-containing particles. The "fluorine-containing particles" can be dispersed in a coating composition for providing a surface having a low surface energy of the coating composition. The "fluorine-containing particles" can have at least one minor dimension in the micro- or nano-scale. For example, the fluorine-containing particles can have a minor dimension ranging from about 25 nanometers to about 50 micrometers.

In some embodiments, the fluorine-containing particles can be dispersed in the polymer matrix by a physical bond (e.g., ionic bond, hydrogen bond, or van der walls) or a chemical bond (i.e., covalent bond) with the polymer chain of the polymer matrix. In other embodiments, the fluorine-containing particles can be dispersed randomly or uniformly in the polymer matrix. In exemplary embodiments, the fluorine-containing particles can include fluorine-containing nanoparticles and can be dispersed randomly throughout the polymer matrix by a physical bond or optionally a chemical bond with the cross-linked polymer chain.

In various embodiments, the fluorine-containing particles can be dispersed in the polymer matrix having a weight loading of, for example, about 5 weight percent or more of the disclosed coating composition. Other embodiments can use about 5 weight percent to about 70 weight percent of the fluorine-containing particles of the coating composition.

The "fluorine-containing particles" can include, for example, fluoropolymer particles. Examples of fluoropolymers can include polytetrafluoroethylene (PTFE, e.g., sold by DuPont under the tradename Teflon), perfluoroalkoxy polymer resin (PFA, e.g., sold by DuPont under the tradename Teflon), fluorinated ethylene-propylene, (FEP, e.g., sold by DuPont under the tradename Teflon), polyethylenetetrafluoroethylene (ETFE, e.g., sold by DuPont under the registered tradename Tefzel, or sold by Asahi Glass company under the registered tradename Fluon), polyvinylfluoride (PVF, e.g., sold by DuPont under the registered tradename Tedlar), polyethylenechlorotrifluoroethylene (ECTFE, e.g., sold by Solvay Solexis under the registered tradename Halar), or polyvinylidene fluoride (PVDF, e.g., solde by Arkema under the registered tradename of Kynar).

Other commercially available fluoropolymers used for the fluorine-containing particles can include, for example, fluoroelastormer, such as Viton A® (copolymers of hexafluoropropylene (HFP) and vinylidene fluoride (VDF or VF2)), Viton®-B, (terpolymers of tetrafluoroethylene (TFE), vinylidene fluoride (VDF) and hexafluoropropylene (HFP)); and Viton (D-GF, (tetrapolymers including TFE, VF2, HFP), as well as Viton E®, Viton E 60C®, Viton E430®, Viton 910®, Viton GH® and Viton GF®. The Viton® designations are Trademarks of E.I. DuPont de Nemours, Inc. In various embodiments, the fluorine-containing particles can also include copolymers of tetrafluoroethylene (TFE) and perfluoro(ethyl vinyl ether) (PEVE), compolymers of tetrafluoroethylene (TFE) and perfluoro(methyl vinyl ether) (PMVE) and mixtures thereof.

Still other commercially available fluoropolymers can include, for example, Fluorel 2170®, Fluorel 2174®, Fluorel 2176®, Fluorel 2177® and Fluorel LVS 76®, Fluorel ® being a Trademark of 3M Company. Additional commercially available materials can include Aflas® a poly(propylene-tetrafluoroethylene) and Fluorel II® (LII900) a poly(propylene-tetrafluoroethylenevinylidenefluoride) both also available from 3M Company, as well as the Tecnoflons identified as For-60KIR®, For-LHF®, NM®, For-THF®, For-TFS®, TH®, and TN505®, available from Montedison Specialty Chemical Company.

The poly(alkylene carbonate) sacrificial material is commercially available, from, e.g. Empower Materials. The poly(alkylene carbonate) has a molecular weight in the range of 10,000 to 800,000, or in the range of 50,000 to 600,000, or in the range of 100,000 to 500,000. The molecular weight is a weight average molecular weight (Mw). The poly(alkylene carbonate) is a copolymer derived from carbon dioxide and produced through the copolymerization of $CO_2$ with one or more epoxides, which decomposes from about 200° C. to about 340° C., or from about 210° C. to about 330° C., or from about 220° C. to about 300° C. As the decomposition is uniform and controlled, the probability of cracks and defects in the final coating is reduced. The pores formed in the fluoropolymer coating reduce the density of fluoropolymer and increase the elasticity, which may also be the mechanism to prevent crack forming during the fabrication process. It is also environmentally acceptable as it the poly(alkylene carbonate) decomposes to $CO_2$ and water, which are benign, with minimal carbon residue. Examples of suitable poly(alkylene carbonates) used herein include poly(propylene carbonate), poly(ethylene carbonate), poly(butylene carbonate), poly(cyclohexene carbonate) and mixtures thereof.

The liquid used in the coating composition includes water and optionally alcohols, aliphatic hydrocarbons having from about five carbon atoms to about 18 carbon atoms such as pentane, hexane, heptane, nonane, dodecane and the like, aromatic hydrocarbons having from about 6 carbon atoms to about 18 carbon atoms such as toluene, o-xylene, m-xylene, p-xylene, and the like, ethers, ketones, amides and mixtures thereof. The liquid provides a media for dispersion of fluorine-containing particles and any fillers. The liquid is present in an amount of from about 20 weight percent to about 90 weight percent, or from about 30 weight percent to about 80 weight percent, from about 50 weight percent to about 70 weight percent of the coating composition.

Additives and additional fillers may be present in the above-described composition or the various layers of the fuser member. In various embodiments, other filler materials or additives including, for example, inorganic particles, can be used for the coating composition and the subsequently formed release layer. Conductive fillers used herein include carbon blacks such as carbon black, graphite, fullerene, acetylene black, fluorinated carbon black, and the like; carbon nanotubes, metal oxides and doped metal oxides, such as tin oxide, antimony dioxide, antimony-doped tin oxide, titanium dioxide, indium oxide, zinc oxide, indium oxide, indium-doped tin trioxide, and the like; and mixtures thereof. Certain polymers such as polyanilines, polythiophenes, polyacetylene, poly(p-phenylene vinylene), poly(p-phenylene sulfide), polypyrroles, polyindole, polypyrene, polycarbazole, polyazulene, polyazepine, poly(fluorine), polynaphthalene, salts of organic sulfonic acid, ammonium or phosphonium salts and mixture thereof can be used as fillers. In various embodiments, other additives known to one of ordinary skill in the art can also be included to form the disclosed composite materials. The fillers are present in an amount of from about 0.1 weight percent to about 50 weight percent, or from about 0.5 weight percent to about 30 weight percent, from about 1 weight percent to about 10 weight percent of the coating composition.

The composition is coated on a substrate in any suitable known manner. Typical techniques for coating such materials on the substrate layer include flow coating, liquid spray coating, dip coating, wire wound rod coating, fluidized bed coating, powder coating, electrostatic spraying, sonic spraying, blade coating, molding, laminating, and the like.

After coating the composition is heated to a first temperature for a time sufficient to decompose the poly(alkylene carbonate) to form the coated layer. The first heating step is at a temperature of from about 200° C. to about 260° C. or from about 210° C. to about 270° C., or from about 220° C. to about 260° C., for a time of from about 15 minutes to about 60 minutes, or a time of from about 20 minutes to about 50 minutes, or a time of from about 25 minutes to about 45 minutes. In this first heating step the poly(alkylene carbonate) decomposes. A second heating step is conducted to melt the fluorine-containing particles. The second heating step is at a temperature 260° C. to about 360° C. or from about 290° C. to about 355° C., or from about 300° C. to about 350° C., for a time of from about 5 minutes to about 30 minutes, or a time of from about 10 minutes to about 25 minutes, or a time of from about 10 minutes to about 20 minutes. The amount of poly(alkylene carbonate) is from about 1 weight percent to about 30 weight percent, or from about 2 weight percent to about 15 weight percent, or from about 3 weight percent to about 10 weight percent based on the total solids in the composition.

Specific embodiments will now be described in detail. These examples are intended to be illustrative, and not limited to the materials, conditions, or process parameters set forth in these embodiments. All parts are percentages by solid weight unless otherwise indicated.

EXAMPLES

Example 1

Figure 3:
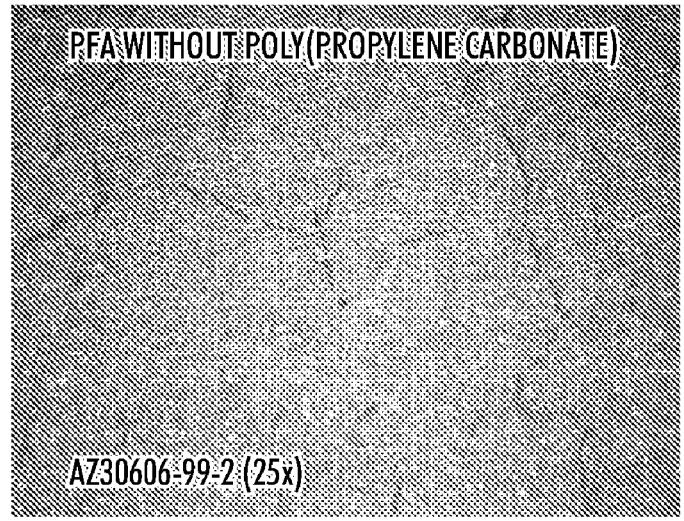
FIG. 3 is a photographic of a fluoroplastic topcoat containing cracks and bubbles.

Preparation of PFA Topcoat without Poly(Alkylene Carbonate) in the Coating Formulation A metal roll having molded silicone was pre-heated at 120° C. for 20 minutes, followed by spraying a primer coating dispersion (PL-990CL, DuPont) to form the first primer layer. A perfluoroalkoxy resin (PFA) aqueous dispersion (EM560, DuPont) was applied on a primed silicone roll by spray coating. The PFA topcoat was formed by heating the roll at 250° C. for 30 minutes, followed by further heating at 350° C. for 8 minutes to melt the PFA. Cracks on the thin PFA topcoat (~11µ) were observed (FIG. 3).

Example 2

Figure 4:
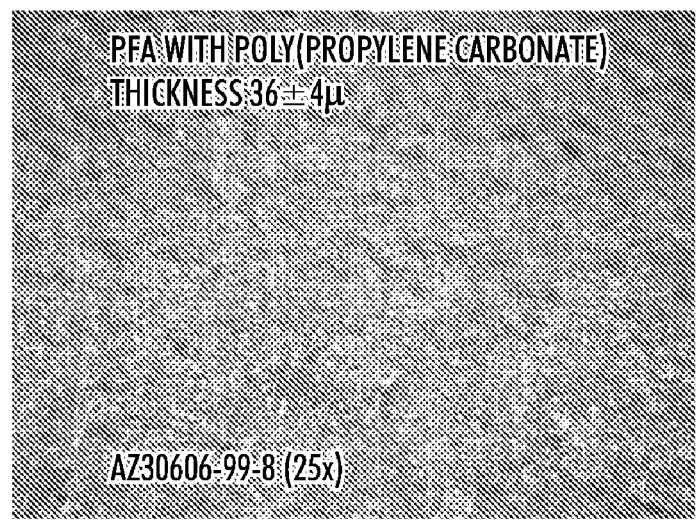
FIG. 4 is a photographic of a fluoroplastic topcoat showing an absence of cracks and bubbles.

Preparation of Crack-Free PFA Topcoat with the Poly(Alkylene Carbonate) in the Coating Formulation Following the same procedure described in Example 1, a fuser roll with a thick (>30 μm), uniform, crack-free PFA topcoat was obtained, as shown in FIG. 4, from a uniform coating dispersion prepared by mixing a poly(propylene carbonate) aqueous emulsion from Empower Materials (QPAC® 40) and a PFA aqueous dispersion (EM560CL, DuPont).

It will be appreciated that variants of the above-disclosed and other features and functions or alternatives thereof may be combined into other different systems or applications. Various presently unforeseen or unanticipated alternatives, modifications, variations, or improvements therein may be subsequently made by those skilled in the art, which are also encompassed by the following claims

What is claimed is:

1. A method of making a fuser member, comprising:
   obtaining a fuser member comprising a resilient layer disposed on a substrate;
   coating an aqueous dispersion of fluorine-containing particles and poly(alkylene carbonate) on the resilient layer to form a coated layer wherein the resilient layer comprises a material selected from the group consisting of silicone rubbers, high temperature vulcanization silicone rubbers, low temperature vulcanization silicone rubbers, liquid silicone rubbers and siloxanes;
   heating the coated layer to a temperature of from about 200° C. to about 260° C. wherein the poly(alkylene carbonate) decomposes; and
   heating the coated layer to a temperature of from about 260° C. to about 360° C. to form a release layer.

2. The method of claim 1 wherein the fluorine-containing particles comprise a material selected from the group consisting of polytetrafluoroethylene; perfluoroalkoxy polymer resin; copolymers of tetrafluoroethylene and hexafluoropropylene; copolymers of hexafluoropropylene and vinylidene fluoride; terpolymers of tetrafluoroethylene, vinylidene fluoride, and hexafluoropropylene; tetrapolymers of tetrafluoroethylene, vinylidene fluoride, and hexafluoropropylene and a cure site monomer, and mixtures thereof.

3. The method of claim 1 wherein the aqueous dispersion further comprises an organic solvent selected from the group consisting of alcohols, aliphatic hydrocarbons having from five carbon atoms to 18 carbon atoms, aromatic hydrocarbons having from 6 carbon atoms to 18 carbon atoms, ethers, ketones, amides, and mixtures thereof.

4. The method of claim 1, wherein the poly(alkylene carbonate) comprises poly(propylene carbonate), poly(ethylene carbonate), poly(butylene carbonate), poly(cyclohexene carbonate) or mixtures thereof.

5. The method of claim 1, wherein the poly(alkylene carbonate) has a molecular weight (Mw) ranging from about 10,000 to about 800,000.

6. The method of claim 1, wherein the poly(alkylene carbonate) has a decomposition temperature ranging from about 200° C. to about 340° C.

7. The method of claim 1 wherein the aqueous dispersion further comprises fillers selected from the group consisting of carbon blacks, carbon nanotubes, graphite, graphene, metal oxides, doped metal oxides, polyanilines, polythiophenes, polyacetylene, poly(p-phenylene vinylene), poly(p-phenylene sulfide), pyrroles, polyindole, polypyrene, polycarbazole, polyazulene, polyazepine, poly(fluorine), polynaphthalene, salts of organic sulfonic acid, ammonium or phosphonium salts, and mixtures thereof.

8. The method of claim 1, wherein the release layer comprises an electrical surface resistivity of from about $10^3$ Ω/sq to about $10^8$ Ω/sq.

9. The method of claim 1, wherein the release layer comprises a thickness of from about 5 microns to about 250 microns.

10. The method of claim 1 wherein the resilient layer comprises a thickness of from about 30 microns to about 10 millimeters.

11. The method of claim 1 wherein the substrate comprises a material selected from the group consisting of aluminum, stainless steel, steel, nickel, polyimides, polyamideimides, polyetherimides, polyether ether ketones and polyphenylene sulfides.

* * * * *